United States Patent [19]
Fischer et al.

[11] Patent Number: 5,397,844
[45] Date of Patent: Mar. 14, 1995

[54] POLYACRYLATES AND THEIR USE AS LEVELLING AGENTS FOR POWDER COATINGS

[75] Inventors: Herbert Fischer, Duesseldorf; Wolfgang Gress, Wuppertal; Doris Oberkobusch, Duesseldorf, all of Germany

[73] Assignee: Henkel Kommanditgesellschaft auf Aktien, Duesseldorf, Germany

[21] Appl. No.: 190,169

[22] Filed: Feb. 7, 1994

[30] Foreign Application Priority Data

Aug. 7, 1991 [DE] Germany ........................ 41 26 076.7

[51] Int. Cl.6 ................................. C08F 8/14
[52] U.S. Cl. ..................................... 525/282; 526/262
[58] Field of Search ........................ 525/282; 526/262

[56] References Cited

U.S. PATENT DOCUMENTS

| | | | |
|---|---|---|---|
| 3,277,030 | 10/1966 | Minsk et al. | 260/8 |
| 4,158,730 | 6/1979 | Baumann et al. | 525/282 |
| 5,047,259 | 9/1991 | Oberkobusch et al. | 427/27 |

FOREIGN PATENT DOCUMENTS

| | | |
|---|---|---|
| 0314042 | 5/1989 | European Pat. Off. . |
| 0355676 | 2/1990 | European Pat. Off. . |
| 0379942 | 8/1990 | European Pat. Off. . |
| 0386507 | 9/1990 | European Pat. Off. . |

*Primary Examiner*—Bernard Lipman
*Attorney, Agent, or Firm*—Ernest G. Szoke; Wayne C. Jaeschke; Norvell E. Wisdom, Jr.

[57] ABSTRACT

Polyacrylates and their use for powder coatings are disclosed. In order to prepare the polyacrylates, acrylic acid, methacrylic acid, their esters with $C_1$–$C_4$ alcohols, and/or fumaric acid, maleic acid, and their anhydrides are first polymerized. The polymers are then reacted with long chain alcohols, one alcohol having an aliphatic chain with 6 to 36 carbon atoms and a second alcohol having a cyclic amide structure. This polyacrylate is suitable as a levelling agent for powder coatings, in particular for powder lacquers. It improves the flowing behavior by reducing the orange peel effect and improves flowability.

20 Claims, No Drawings

POLYACRYLATES AND THEIR USE AS LEVELLING AGENTS FOR POWDER COATINGS

FIELD OF THE INVENTION

This invention relates to polyacrylates and to their use as flow control agents in powder coating, more particularly for powdered lacquers.

STATEMENT OF RELATED ART

Low-solvent and solvent-free coating systems are acquiring increasing significance. This group of coating systems includes powder coating, i.e. the coating of metals and plastics by the application and sintering of hot-curing powders. They may be applied by rotational coating, powder spraying, fluidized bed coating and above all by electrostatic coating. Thermoset powder lacquers of epoxy, polyester and acrylic resins are particularly suitable for electrostatic powder coating. Thermoplastics of polyamide, polyester, polyethylene, polyethylene/vinyl acetate, polyvinyl chloride and polyepoxides are preferably used for fluidized bed coating. Powder coating is used above all for machine parts and household equipment (for example steel furniture).

To promote the flow of the powdered lacquer in fluidized bed coating, flow control agents are added so that any defects formed, such as streaks, blisters, craters, orange peel structures and pinholes, are largely evened out during the application process. Known flow control agents include acrylate polymers, generally in the form of liquid polyacrylate-based products which, basically, may be incorporated in the powdered lacquers in two different ways, namely:

1. A so-called master batch is prepared. In this case, the liquid flow control agent is melted into the binder component of the powdered lacquer. The solidified melt is then broken up and made up into a form suitable for further processing.
2. An inert carrier, for example silica gel, is used for the liquid products.

The disadvantage of master batch technology is that the formulation of powdered lacquers is limited because the binder of the master batch has to be identical or at least compatible with the main binder of the formulation. Flow control agents applied to a support can lead to a reduction in the gloss of the lacquer and to a deterioration in the transparency of clear lacquers and, under adverse conditions, even to a reduction in the stability of the powdered lacquer in storage.

Powder-form flow control agents have been developed to overcome these disadvantages, particularly for the production of clear lacquers, requiring neither an inert support nor the preparation of a master batch. One such flow control agent is described in EP 0 355 676. Copolymers of:

a) long-chain alkyl acrylates corresponding to the formula $CH_2=CR^1-CO-OR^2$ where $R^1$ is a hydrogen atom or a methyl group and $R^2$ is the residue of a $C_{16-34}$ fatty alcohol and
b) N-containing acrylate- or methacrylate-functional olefins are described as flow control agents for powder lacquers. They are prepared by copolymerization from the corresponding comonomers. 0.5% by weight of this copolymer prevents the formation of "fish eyes" and craters. In other words, the largest defects are avoided. By contrast, a uniform surface free from orange peel effects is not achieved. In addition, these copolymers do not flow at temperatures above 45° C., so that problems arise during storage and incorporation.

DESCRIPTION OF THE INVENTION

Object of the invention

Accordingly, the problem addressed by the present invention was to improve the known powder-form flow control agent in its handling and in its function and, more particularly, in its flow properties and flow-improving properties.

SUMMARY OF THE INVENTION

The solution provided by the invention is defined in the claims and resides essentially in the combination of at least three different structural units and in the twostage production by polymerization and subsequent polymer-analog reaction.

Since only about 70 mole-% of the functional groups react in the polymer-analog transesterification, polyacrylates bearing the following structural units are formed:

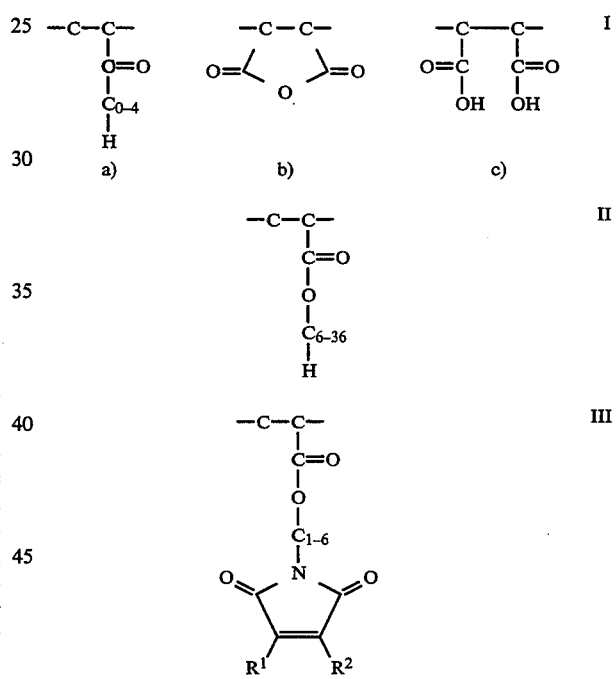

The structural units I, II and III are compulsory. The structures I emanate from the original polymers of acrylic acid or esters thereof and maleic acid or maleic anhydride. Where methacrylic acid and fumaric acid are used, corresponding structural units are formed.

DESCRIPTION OF PREFERRED EMBODIMENTS

The polyacrylates according to the invention have an average molecular weight $M_w$ below 150,000 and preferably below 100,000 and an $M_n$ molecular weight below 60,000 and preferably below 45,000. The molecular weights were determined by GPC against polystyrene as the calibration standard.

Their melting ranges begin beyond about 40° C. and preferably at 45° C. and higher. The melting points were determined on a Kofler heating bench.

The polyacrylates according to the invention can best be characterized by their production process. They can be produced by:
polymerization of at least one of the following monomers: acrylic acid, methacrylic acid, crotonic acid, iraconic acid, fumaric acid, maleic acid, their esters with $C_{1-4}$ alcohols, and the anhydride of maleic acid,
polymer-analog reaction of the polymer obtained with alcohols a) and b), alcohol a) being an aliphatic linear or branched $C_{6-36}$ alcohol or a mixture of such alcohols and alcohol b) being an alcohol with an imide structure corresponding to the following general formula:

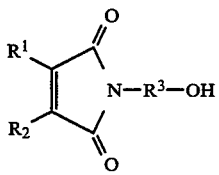

in which $R^1$ and $R^2$ independently of one another represent hydrogen or a $C_{1-4}$ alkyl group or together may form a $C_5$ or $C_6$ ring,
$R^3$ is a linear or branched alkylene group containing 1 to 6 carbon atoms or a cyclic $C_5$ or $C_6$ alkyl group and
the C-C double bond may be hydrogenated.

The polyacrylate may also usefully contain 0 to 30% by weight and preferably to 10% by weight of an additional comonomer. Preferred comonomers are ethylene, styrene or acrylonitrile. Other possible comonomers are butadiene, vinyl chloride, vinylidene chloride, vinyl pyridine, N-vinyl pyrrolidone and acrylamide.

Preferred structural units for the polyacrylate are maleic anhydride and esters of acrylic acid and methacrylic acid, more particularly methyl and ethyl acrylate. Methyl acrylate in combination with behenyl alcohol and nitrogen (2-hydroxyethyl)phthalimide is most particularly preferred.

The ester containing structural unit II formed from alcohol a) should make up from 15 to 45% by weight, preferably from 20 to 40% by weight and more preferably from 25 to 35% by weight of the end product. Contents of 10 to 30% by weight and more especially 15 to 25% by weight of structural units II from alcohols containing approximately 22 carbon atoms are particularly preferred. Alcohols a) with chain lengths of 16 to 24 carbon atoms are preferred.

In the preferred alcohols b), $R^1$ and $R^2$ form a ring, more particularly an aromatic ring which may be substituted by $C_{1-4}$ alkyl groups. The structural unit formed from alcohol b) generally makes up from 30 to 70% by weight, preferably from 40 to 65% by weight and more preferably from 50 to 65% by weight of the end product. In addition to alcohols a) and b), other aliphatic, aromatic or cycloaromatic alcohols or even amines may be used for the reaction. Cyclohexanol, phenylethanol, dimethyl aminopropylamine and primary amines containing 6 to 34 carbon atoms are preferred. The structural units obtained from them may make up from 0 to 20% by weight and more particularly from 0 to 10% by weight of the end product.

The desired molecular weight may be obtained in various ways, for example by a high initiator concentration or by addition of a regulator unless one of the monomer components already acts as a regulator. Mercapto compounds are particularly suitable regulators. In addition, $CCl_4$, $CBr_4$ and $CBr_2Cl_2$ may also be used. Depending on their effectiveness, the regulators may be used in quantities of 0.2 to 5% by weight, based on the monomers.

The polyacrylates according to the invention may be produced by various processes. The preferred process (A) is characterized by the following steps:
I) preparation of the alcohol b) from the anhydride and the alkanolamine,
II) polymerization in the presence of the alcohol b) and
III) polymer-analog reaction of alcohols a) and b) and optionally other alcohols and amines. Another suitable process (B) is characterized by the following steps:
I) polymerization in the absence of alcohol b), but in the presence of a regulator,
II) preparation of alcohol b) in the polymerization mixture from the anhydride and the alkanolamine and
III) polymer-analog reaction of alcohols a) and b) and optionally other alcohols and amines.

Alcohol component b) is best prepared from the corresponding anhydrides and alcohol amines with azeotropic removal of the water in suitable solvents, such as toluene or xylene. There is no need for a catalyst. The reaction is quantitative.

The polymerization takes place under the usual conditions of radical polymerization at temperatures of 60° to 140° C. with the usual azo or peroxide initiators, for example azo-bis-isobutyronittile, dibenzoyl peroxide, dilauroyl peroxide, in the presence of an inert solvent, for example toluene, xylene or N-methyl pyrrolidone.

The polymer-analog reaction is generally carried out at temperatures of 140 to 220° C. The temperature is of course determined by the catalysts. Suitable catalysts are, for example, sodium alcoholate, more particularly methylate, tin, organotin compounds, p-toluenesulfonic acid, tetraisopropyl titanate, sulfuric acid, potassium carbonate and lithium hydroxide. The most effective catalysts are the organotin compounds.

The polyacrylates according to the invention thus produced are suitable as flow control agents for powder coatings, more particularly powdered lacquers. More particularly, the polyacrylates according to the invention may be dry-mixed with other solids, more particularly with hydrogenated castor oil and its derivatives. The mixing ratio of polyacrylate to castor oil or derivatives is generally 3 to 1:1 and preferably 1 to 2:1.

The present invention also relates to powdered lacquers. They contain thermoplastic or thermoset synthetic resins and 0.1 to 2.0% by weight and preferably 0.5 to 1% by weight, based on the total weight of the powdered lacquers, of one or more of the polyacrylates according to the invention and optionally typical additives, such as curing agents, curing accelerators, pigments and UV stabilizers. Powdered lacquers based on epoxides for crosslinking with carboxyfunctional polyesters (so-called hybrid systems) and on carboxyfunctional polyesters for crosslinking with triglycidyl isocyanurates are particularly preferred.

The advantages of the new polyacrylates lie essentially in their ready processability to powdered lacquers (for example during dry mixing and metering), in their relatively high stability in storage (for example no caking) and in their better flow behavior (for example not only are "fish eyes", "craters" and "pinholes" avoided, the orange peel effect is also distinctly reduced, providing for better gloss development). The polyacrylates according to the invention enable completely streak-free clear lacquer films to be produced. The polyacrylates are coarsely crystalline powders varying from white to light brown in color. They are highly compatible with other additives, more particularly with hydrogenated castor oil and derivatives thereof.

The invention is illustrated by the following Examples.

The products were characterized as follows:
1. The melting range was determined with a Kofler heating bench.
2. The molecular weight was determined by GPC in relation to polystyrene standards.
3. The specific viscosity was determined in a 5% toluene solution at 20° C.
4. The OH value was determined in accordance with DIN 53240.
5. Gloss was determined in accordance with DIN 67530.

General production procedure (B) for Examples A to F of Table 1:

Approximately 10% of the monomers are mixed with the regulator and the resulting mixture is dissolved in toluene. Approximately 20% of the initiator are added and the resulting mixture is heated to around 85° C. After the polymerization has started, the remaining quantity of monomers and initiator is added over a period of 2 h. After the addition, polymerization is carried out for 1 h at 90° C. To produce the imide, the anhydride is added at 90° C. and the alkanolamine is then slowly added dropwise. The mixture is then slowly heated under reflux on a water separator until the theoretical quantity of water has been removed.

For the polymer-analog reaction, the long-chain alcohols and optionally other alcohols are added to the solution heated to 100° C. After addition of the catalyst, the temperature is increased to 140°–220° C. and toluene and the lower alcohol formed are distilled off. To complete the reaction, vacuum of approximately 30 mm Hg ($\approx$40 mbar) is applied towards the end of the reaction.

General production procedure (A) for Examples G to L of Table 2:

To produce the imide, the anhydride is dissolved in toluene and the mixture is heated to the reflux temperature. The alkanolamine is slowly added dropwise. The water of reaction formed is completely removed on a water separator. For polymerization, the solution is cooled to 85° C., after which 10% of the monomers and 20% of the initiator are added. After the beginning of polymerization, the remaining monomers and the remaining initiator are added over a period of 2 h. Polymerization is then continued for 1 h at 90° C.

For the polymer-analog reaction, the long-chain alcohols and optionally other alcohols are added to the reaction mixture heated to 110° C. The temperature is increased to 140°–220° C., toluene and the lower alcohol formed distilling off. To complete the reaction, a vacuum of approximately 30 mm Hg ($\approx$40 mbar) is applied towards the end of the reaction.

Flow control agents were produced by general methods A and B using monomers, regulators, initiators, alcohols and amines according to Tables 1 and 2. Low molecular weight polyacrylates having a specific viscosity of 0.34 to 1.38 and a melting point (Mp.) of 38° to 52° C. were obtained.

The polyacrylates of Example H and Example C were light to medium brown in color and hard. They had an OH value of <20 mg KOH/g.

Abbreviations used

EA: Ethyl acrylate
MA: Methyl acrylate
MMA: Methyl methacrylate
MAS: Methacrylic acid
N-HEP: N-(2-hydroxyethyl)-phthalimide
N-HES: N-(2-hydroxyethyl)-succinimide
N-HIP: N-(2-hydroxyisopropyl)-phthalimide
AIB N: Azo-bis-isobutyronitrile
DLP: Dilauroyl peroxide
IOMPA: Mercaptopropionic acid isooctyl ester
Stenol 1822 A (Henkel): Fatty alcohol cut containing approximately 70% $C_{22}$ fraction
Stenol 1618 (Henkel): Fatty alcohol cut, mainly $C_{16/18}$ fractions
TIPOT: Tetraisopropyl titanate
Swedcat 5 (Swedstab): Organolin catalyst

TABLE 1

Production of Flow Control Agents by Method B
All mixtures contain 0.5% by weight of
IOMPA and 1.0% by weight of initiator, based on the monomers.

| Prod. No. | Monomer I type/g | Monomer II type/g | Initiator | Alcohol b type/g | Alcohol a stenol type/g | Other alcohol/ amine type/g | Viscosity (spec.) | Mp. °C. |
|---|---|---|---|---|---|---|---|---|
| A | EA 52.1 | — | AIBN | N-HEP 54.4 | 1822 A 29.2 | — | 0.69 | 40 |
| B | MA 44.8 | — | AIBN | N-HEP 54.4 | 1618 23.5 | — | 0.53 | 38 |
| C | MA 44.8 | — | DLP | N-HEP 54.4 | 1822 A 29.2 | — | 1.05 | 50 |
| D | MA 44.8 | — | AIBN | N-HES 40.5 | 1822 A 23.3 | Cyclohexanol 1.8 | 1.10 | 39 |
| E | MA 44.8 | — | AIBN | N-HEP 54.4 | 1822 A 20.4 | Tallow amine 7.2 | 0.44 | 45 |
| F | MA 44.8 | MMA 10.4 | AIBN | N-HEP 54.4 | 1822 A 29.2 | — | 0.60 | 40 |

TABLE 2

| | | | Production of Flow Control Agents by Method A | | | | | |
|---|---|---|---|---|---|---|---|---|
| Prod. No. | Monomer I type/g | Monomer II type/g | Regulator type/g | Initiator type/g | Alcohol b type/g | Alcohol a type/g | Catalyst type/g | Viscosity (spec.) | Mp. °C. |
| G | MA 40.3 | MAS 4.5 | — | AIBN 0.5 | N-HIP 58.3 | Stenol 1822 A 29.2 | Swedcat 5 0.7 | 0.91 | 40 |
| H | MA 224.1 | — | — | AIBN 2.2 | N-HEP 271.3 | Stenol 1822 A 146.0 | Swedcat 5 3.2 | 0.85 | 45 |
| I | MA 224.1 | — | IOMPA 2.2 | AIBN 2.2 | N-HEP 271.3 | Stenol 1822 A 146.0 | Swedcat 5 3.2 | 0.53 | 45 |
| J | MA 224.1 | — | IOMPA 2.2 | AIBN 2.2 | N-HEP 271.3 | Stenol 1822 A 146.0 | $H_2SO_4$ 6.4 | 0.34 | 45 |
| K | MA 224.1 | — | — | DLP 2.2 | N-HEP 271.3 | Stenol 1822 A 146.0 | TIPOT 4.8 | 1.02 | 52 |
| L | MA 224.1 | — | — | AIBN 2.2 | N-HEP 271.3 | Stenol 1822 A 146.0 | $NaOCH_3$ 6.4 | 1.38 | 50 |

The copolymers to be used in accordance with the invention were tested in the following powdered lacquer systems to determine their suitability as flow control agents.

I Epoxy lacquer

A powdered lacquer composition of 50 parts by weight of an epoxy resin I, 50 parts by weight of a polyester resin II and 0.5 part by weight of benzoin were mixed with addition of 1 part by weight of the flow control agent to be tested. The mixture was then extruded, granulated, ground and sieved. The powders obtained were electrostatically applied to the metal surface and stoved for 12 minutes at 180° C. The epoxy resin used was a commercial product based on bisphenol A and epichlorohydrin. The oil-free polyester resin used was also a commercial product containing free carboxyl groups. The resins had the following characteristic data:

| | I | II |
|---|---|---|
| Epoxide equivalent weight | 715-835 | |
| Glass transition temperature °C. | — | 43-48 |
| Softening range (Kofler) °C. | 70-80 | 70-80 |
| Acid value (DIN 53402) | — | 60-80 |
| Melt viscosity Pa.s | | |
| (DIN 53229/160° C./cone-plate) | — | 8-16 |
| (DIN 53735/120° C./21.2 N) | Approximately 50 | — |

II Polyester lacquer

A powdered lacquer was produced as described in I from 55.3 parts by weight of a polyester resin containing free carboxyl groups and 4.2 parts by weight of triglycidyl isocyanurate with addition of 1 part by weight of flow control agent and applied to a metal surface. The polyester resin had the following characteristic data:

| Softening point (Kofler) | 77-87° C. |
|---|---|
| Glass transition temperature | 55-60° C. |
| Melt viscosity | 30-60 Pa.s |
| (DIN 53229/160° C./cone-plate) | |
| Acid value (DIN 53402) | 30-36 mg KOH/g |

The stoving conditions were 5 minutes at 200° C., 8 minutes at 180° C. or 17 minutes at 165° C. (the temperatures shown represent the object temperatures).

The flow control agents of Examples H and C could be satisfactorily processed. They remained free-flowing. The clear lacquers obtained showed no signs of clouding, even in layer thicknesses of >100 μm.

They were also free from "fish eyes" and "craters", i.e. showed good leveling. The orange peel effect was only just visible. Gloss measurement produced values of 71, 92 and 97% for angles of 20, 60 and 85° in the case of the flow control agent of Example H in the epoxy lacquer and values of 72, 92 and 97 in the polyester lacquer.

The flow control agent of Example C produced values of 68, 96 and 93 in the epoxy lacquer and values of 77, 90 and 96 in the polyester lacquer.

A test carried out for comparison with the flow control agent according to Example 1 of EP 356 676 produced gloss values of 53% at 20° in the epoxy lacquer and 64% at 20° in the polyester lacquer.

The results obtained show that the handling and flow control properties were significantly improved by modifying the production process (polymerization and polymer-analog reaction on the one hand and copolymerization on the other hand) and by modifying the structural units of the polyacrylate (additional free acid or ester with a $C_{1-4}$ alcohol).

The invention claimed is:

1. Polyacrylate produced by a process comprising steps of:
   (A) polymerization of monomers selected from the group consisting of acrylic acid, methacrylic acid, crotonic acid, itaconic acid, fumaric acid, maleic acid, their esters with $C_{1-4}$ alcohols, and maleic anhydride, optionally together with other monomers to an extent of not more than 30% by weight of the total monomers polymerized;
   (B) polymer-analog reaction of the polymer obtained in step (A) with alcohols a) and b), alcohol a) being an aliphatic linear or branched $C_{6-36}$ alcohol or a mixture of such alcohols and alcohol b) being an alcohol with an imide structure corresponding to the following general formula:

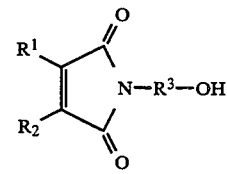

in which $R^1$ and $R^2$ independently of one another represent hydrogen or a $C_{1-4}$ alkyl group or together may form a $C_5$ or $C_6$ ring, $R^3$ is a linear or branched alkylene group containing 1 to 6 carbon atoms or a cyclic $C_5$ or $C_6$ alkyl group and the C—C double bond may be hydrogenated, only about 70 mole-% of the functional acid or ester groups of the polymer produced in step A reacting in the polymer-analog (trans)esterifcation.

2. A polyacrylate as claimed in claim 1, wherein at least 90% by weight of the monomers that are polymerized in step (A) are selected from the group consisting of acrylic acid, methacrylic acid, crotonic acid, itaconic acid, fumaric acid, maleic acid, their esters with $C_{1-4}$ alcohols, and maleic anhydride; and any remaining monomers that are polymerized in step (A) are selected from the group consisting of ethylene, styrene and acrylonitrile.

3. A polyacrylate as claimed in claim 1, wherein the monomers that are polymerized in step (A) include at least one of the following monomers: maleic anhydride and methyl and ethyl acrylate.

4. A polyacrylate as claimed in claim 1, wherein ester formed from alcohol a) is present in the end product in a percentage by weight of 25 to 35.

5. A polyacrylate as claimed in claim 1, wherein ester formed from alcohol b) is present in the end product in a percentage by weight of 50 to 65.

6. A polyacrylate as claimed in claim 1, produced by a process wherein, in addition to alcohols a) and b), materials selected from the group consisting of cyclohexanol, phenylethanol, dimethyl aminopropylamine and primary amines containing 6 to 34 carbon atoms take part in the polymer-analog reaction, the ester and amide structural units formed from these additional alcohols or amines making up not more than 10% by weight of the end product.

7. A polyacrylate as claimed in claim 1, produced by a process in which from 0.2 to 5% by weight of a regulator is added to the polymerization mixture.

8. A process for the production of the polyacrylate claimed in claim 1, said process comprising steps of:
   I) preparation of the alcohol b) from anhydride and alkanolamine,
   II) polymerization in the presence of the alcohol b) and
   III) polymer-analog reaction of alcohols a) and b) and optionally other alcohols and amines.

9. A process for the production of the polyacrylate claimed in claim 1, said process comprising steps of:
   I) polymerization in the absence of alcohol b), but in the presence of a regulator,
   II) preparation of alcohol b) in the polymerization mixture from anhydride and alkanolamine and
   III) polymer-analog reaction of alcohols a) and b) and optionally other alcohols and amines.

10. A flow control agent which contains a polyacrylate according to at claim 1.

11. A powdered lacquer containing the polyacrylate claimed in claim 1.

12. A polyacrylate as claimed in claim 1, wherein the monomers that are polymerized in step (A) include at least one of the following monomers: maleic anhydride and esters of acrylic acid and methacrylic acid.

13. A polyacrylate as claimed in claim 1, wherein ester formed from alcohol a) is present in the end product in a percentage by weight of 15 to 45 in the end product.

14. A polyacrylate as claimed in claim 1, wherein ester formed from alcohol b) is present in the end product in a percentage by weight of 30 to 70.

15. A polyacrylate as claimed in claim 1, produced by a process wherein, in addition to alcohols a) and b), aliphatic, aromatic or cycloaromatic alcohols or amines take part in the polymer-analog reaction, the ester and amide structural units formed from these additional alcohols or amines making up not more than 20% by weight of the end product.

16. A powdered lacquer containing the polyacrylate claimed in claim 6.

17. A powdered lacquer containing the polyacrylate claimed in claim 5.

18. A powdered lacquer containing the polyacrylate claimed in claim 4.

19. A powdered lacquer containing the polyacrylate claimed in claim 3.

20. A powdered lacquer containing the polyacrylate claimed in claim 2.

* * * * *